United States Patent
Ahmavaara et al.

(10) Patent No.: US 7,031,701 B1
(45) Date of Patent: Apr. 18, 2006

(54) DELAY CONTROL METHOD

(75) Inventors: Kalle Ahmavaara, Vantaa (FI); Sami Kekki, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/646,776

(22) PCT Filed: Mar. 31, 1999

(86) PCT No.: PCT/FI99/00269

§ 371 (c)(1),
(2), (4) Date: Oct. 31, 2000

(87) PCT Pub. No.: WO99/50972

PCT Pub. Date: Oct. 7, 1999

(30) Foreign Application Priority Data

Mar. 31, 1998 (FI) .................................................. 980735

(51) Int. Cl.
*H04Q 7/20* (2006.01)

(52) U.S. Cl. ...................... 455/423; 455/426.1; 455/18; 370/236; 370/233

(58) Field of Classification Search ................. 455/423, 455/426.1, 18; 370/236, 329, 233, 444
See application file for complete search history.

(56) References Cited

U.S. PATENT DOCUMENTS

| 5,268,933 A | | 12/1993 | Averbuch | |
|---|---|---|---|---|
| 5,742,588 A | * | 4/1998 | Thornberg et al. | .......... 370/236 |
| 5,757,772 A | | 5/1998 | Thornberg | |
| 6,097,700 A | * | 8/2000 | Thornberg et al. | .......... 370/233 |

FOREIGN PATENT DOCUMENTS

| EP | 0 795 970 A2 | | 9/1997 |
|---|---|---|---|
| JP | 10271059 A | * | 10/1998 |
| WO | WO 97/11568 | | 3/1997 |
| WO | WO 97/16040 | | 5/1997 |

OTHER PUBLICATIONS

Danny H.K. Tsang and Wales Kin Fai Wong, A New Rate–Based Switch Algorithm for ABR Traffic to Achieve Max–Min Fairness with Analytical Approximation and Delay Adjustment, IEEE 1996, p. 1174 (Abstract).
Computer generated translation of JP 10–271059.

* cited by examiner

*Primary Examiner*—David Hudspeth
*Assistant Examiner*—S. Smith
(74) *Attorney, Agent, or Firm*—Cohen, Pontani, Lieberman & Pavane

(57) ABSTRACT

The invention is directed to a method for controlling delays in a cellular telecommunications network. The delay control method according to the invention is based on a hierarchical structure of delay controlling entities, which preferably communicate only with entities directly above or below them in the hierarchy. In the downlink direction, an entity receiving data, such as a base station or a splitting unit, sends a timing report to the entity sending the data if the data is received too early or too late, whereafter the sending entity may adjust the sending time of data. The same reporting and adjusting process may be repeated through all levels of the control hierarchy, resulting in a collective control of delays from the top of the hierarchy, for example from a RNC, to the bottom, for example to a base station. In the uplink direction, a higher level entity receiving data from a lower level entity may command the lower level entity to adjust the sending time, if the data is received too early or too late. When the same action is repeated in all levels of the hierarchy, a collective control of delays is achieved for the link between the lowest level, e.g. the base station, and the highest level, e.g. a RNC.

10 Claims, 3 Drawing Sheets

DELAY CONTROL METHOD

PRIORITY CLAIM

This is a U.S. national stage of application No. PCT/FI99/00269, filed on March 31, 1999. Priority is claimed on that application and on the following application:
Country: Finland, Application No.: 980735, Filed: Mar. 31, 1998.

TECHNICAL FIELD OF THE INVENTION

The invention is directed to a method for controlling delays in a cellular telecommunications network.

BACKGROUND OF THE INVENTION

Modern cellular telecommunication systems comprise complicated structures of network elements. New developments, such as macro diversity combining, increase the complexity of a network. Macro diversity combining (MDC) refers to a situation, where terminal unit of a cellular telecommunication system has simultaneous connections to at least two base stations, in which case any given data unit can be routed to the terminal unit or from the terminal unit via at least two routes. The set of such base stations is called the active set. Macro diversity combining can be utilized especially in spread spectrum technology based systems, when the terminal unit is near the border of cells or in an area, where more than one cells overlap at least partly. One of the advantages of macro diversity combining (MDC) is the resistance to various disturbances occurring in the propagation paths. Since fading and disturbances occurring in a given propagation path can be compensated using data transmitted via another propagation path, MDC provides a better quality of transmission than schemes based on use of single connections.

In cellular systems based on spread spectrum technology, it is advantageous to minimize the transmission power of mobile and base stations in order to maximize the capacity of the system. Macro diversity combining allows the use of lower transmitting power than in a system, where all other things being equal, the radio link between the mobile station and the network is carried by a single connection. On the other hand, spread spectrum technology offers good possibilities to combine signal components arriving to the combination location with varying delays and power levels, due to different propagation paths or macro diversity paths. Due to these reasons, the use of macro diversity combining will increase in the future. The most common application of spread spectrum technology is the CDMA (Code Division Multiple Access) cellular telecommunication technology.

An example of a radio network configuration providing macro diversity combining is shown in FIG. 1. Downlink data is transmitted from the protocol control block 32 in the first radio network controller (RNC) RNC1 30 to the first splitting unit 34 in the RNC1, which splitting unit replicates the downlink data stream into one stream towards a second splitting unit 34 in the RNC1, and another data stream towards the splitting unit 34 in RNC2. The second splitting unit 34 in RNC1 replicates the received data stream into one stream towards a first base station (BS) 20 and another data stream towards a second base station 20. The splitting unit 34 in RNC2 further replicates the received data stream into one stream towards a third base station 20 and another data stream towards a fourth base station 20.

Uplink data from the mobile station (MS) 10 is received separately by each base station 20. The first and second base stations send the received data packets to the second combining unit 33 in RNC1, and the third and fourth base stations send the received data packets to the combining unit 33 in RNC2. When the combining units 33 have received the packets, they combine the packets and send only one packet further. The first combining unit 33 receives the output from the other two combining units, and combines the data packets, and forwards the combined data packets to the protocol control block 32.

The combining units 33 may perform the combining in many ways. For example, the units may select only one of the two received packets and send the selected packet. They also may combine the signals of the two packets and send the combined packet.

For clarity, the splitting 34 and combining 33 units are represented by a single symbol in FIG. 1.

In such a configuration, problems are caused by the fact that each downlink packet has to be sent from each BS towards the MS at roughly the same time or within a small time window, while the delay from the RNC to base stations varies. The delay variation may be caused by numerous reasons. For example, physical distance and transmission links between base stations and the radio network controller changes when the base station (BS) or base stations used by a mobile station (MS) is/are changed. Further, each part of the chain of transmission links can have different properties such as bitrate and characteristic delay variation, which properties may change due to variations in traffic or for other reasons. Delays are in turn caused for example by the physical length of the transmission links, and processing of the transmitted data in the network entities. Such processing can for example be encoding, splitting, or combining of data packets. A further problem in downlink direction is, how to keep the difference between the sending time of packets from RNC and transmission time of the packets by the base stations in minimum, while still fulfilling the edge condition, that each BS receives the data before it has to be transmitted.

In the uplink direction, a problem is how to determine the combining time for each combining/splitting unit, while still fulfilling the edge condition that the combined data packet is to be received by the protocol control block by the defined time. The combining time is the point in time, by which a combining unit must send the combined data to its output, regardless of whether all packets to be combined are received or not.

An additional problem, which is not solved by the prior art structures, is how to take advantage of statistical multiplexing gains resulting of multiplexing of transmission links, since the more efficiently the data is multiplexed, the longer the average delay is and especially, the longer the delay variation is. Statistical multiplexing gains refer to savings in the use of data transmission resources obtained, when the data packet transmission times and other transmission parameters of bearers having relatively loose delay requirements are adjusted in order to accommodate data packets of bearers having stricter delay requirements.

The prior art solutions do not address all of the previous problems. One prior art solution is used in the GSM system, where in the downlink direction, a base station can indicate to a transcoder unit, that the transcoder unit has to advance the transmission times of frames sent towards the base station. This mechanism is explained in detail in the specification GSM 08.60.

SUMMARY OF THE INVENTION

The object of the invention is to realize a delay control method for allowing more accurate control of delays than in the prior art systems. A further object of the invention is to realize a delay control method, which allows a modular network structure to be used in the implementation of the method.

The objects are reached by performing the delay control in a hierarchical way using a tree-like delay adjustment hierarchy, where each node of the tree adjusts the delay of its branches.

The method for delay control adjustment in the uplink direction according to the invention is characterized by that, which is specified in the characterizing part of the independent method claim directed to a method for delay control adjustment in the uplink direction. The method for delay control adjustment in the downlink direction according to the invention is characterized by that, which is specified in the characterizing part of the independent method claim directed to a method for delay control adjustment in the downlink direction. The system according to the invention is characterized by that, which is specified in the characterizing part of the independent method claim directed to a system. The dependent claims describe further advantageous embodiments of the invention.

The delay control method according to the invention is based on a hierarchical structure of delay controlling entities, which preferably communicate only with entities directly above or below them in the hierarchy. In the downlink direction, an entity receiving data, such as a base station or a splitting unit, sends a timing report to the entity sending the data if the data is received too early or too late (outside a predefined time period), whereafter the sending entity may adjust the sending time of data. The same reporting and adjusting process may be repeated through all levels of the control hierarchy, resulting in a collective control of delays from the top of the hierarchy, for example from a RNC, to the bottom, for example to a base station.

In the uplink direction, a higher level entity receiving data from a lower level entity may command the lower level entity to adjust the sending time, if the data is received too early or too late. When the same action is repeated in all levels of the hierarchy, a collective control of delays is achieved for the link between the lowest level, e.g. the base station, and the highest level, e.g. a RNC.

BRIEF DESCRIPTION OF THE DRAWINGS

The invention is described in more detail in the following with reference to the accompanying drawings, of which

Same reference numerals are used for similar entities in the figures.

DETAILED DESCRIPTION

Figure 1:
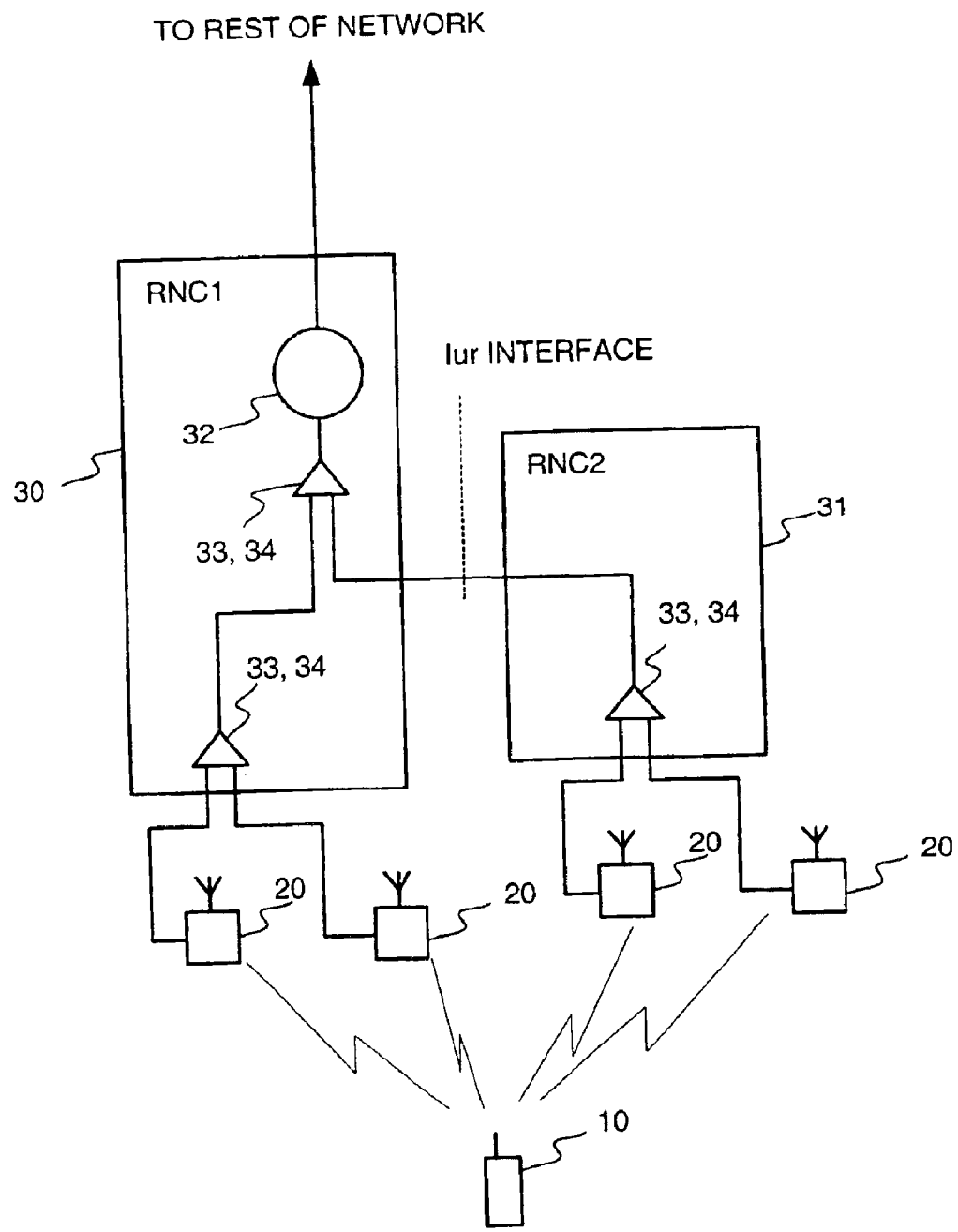
FIG. 1 illustrates a hierarchical network structure according to prior art.

Adjustment of Delays in the Downlink Direction

In the downlink direction, the delays are adjusted as follows according to an advantageous embodiment of the invention. If an entity, herein called the receiving entity, receives packets too late for one or more bearers, or if packets are received too early, before a certain predefined point in time, the receiving entity informs the entity preceding it in the downlink direction in the transmission path about the inaccurate timing. As a response, the preceding entity adjusts the transmission time of the packets to bring the arrival time of the packets to the receiving entity closer to the desired arrival time. In case the preceding entity cannot send the packets earlier due to the arrival time of packets to the preceding entity, the preceding entity may also inform the entity before it in the downlink direction of the transmission path, that the packets are received too early. Preferably, this mechanism of informing and adjustment is executed at each entity below the radio network controller in a downlink transmission path, thus forming a chain of delay controlling nodes from the RNC to each base station controlled by the RNC. In an advantageous embodiment of the invention, the base stations are the lowest level entities which send timing reports, and the controlling, i.e. the anchor RNC is the highest level entity reacting to the timing reports.

The invention is not limited to such an embodiment, where all entities between the RNC and a base station participate in the delay control. In some embodiments of the invention, at least one of the intermediate entities such as splitting units between the RNC and a base station does not perform delay controlling. For example, in such an embodiment, the base stations may send a report of the packet arrival times, which report is merely sent further by the entities between the base station and the protocol control block of the RNC, and which report is finally received by the protocol control block, which subsequently adjusts the transmission time of downlink data packets.

In one advantageous embodiment of the invention, the transmission time of downlink data packets from an entity is determined by the link having longest delay estimate, i.e. by the latest reported arrival time.

In some embodiments of the invention, the receiving entity may inform the preceding entity about the timing repeatedly, with predetermined intervals, even if packets are not received too late or too early. The preceding entity then only reacts to the report, if the timing deviates too much from the desired optimum timing.

In an advantageous embodiment of the invention, the delay can be controlled separately for each bearer or commonly for all bearers for a mobile station. Delay control of all bearers allows simple adjustment of all bearers for example in a situation, when the transmission link configuration changes e.g. due to a handover, which usually affects all bearers of a mobile station in substantially similar way. Each splitting unit causes also processing delay, and since the number of splitting units in a transmission path can vary when the transmission link configuration changes, the delay between a base station and the radio network controller can change stepwise for all bearers of a mobile station passing through a single base station. On the other hand, delay control of single bearers allows producing of different delays for different bearers, which in turn allows more efficient multiplexing of transmission links for bearers having less strict delay requirements. In a further embodiment of the invention, the delay can be controlled for a group of bearers as well. Therefore, a timing report may comprise identification and timing data for a single bearer, identification and timing data for multiple bearers, or identification and timing data for all bearers of a mobile station. For example, in terms of one set of specifications for an UMTS cellular system, a timing report may be specific to a certain RLC protocol, or a group of RLC protocols, or specific to a MAC protocol.

Figure 2:
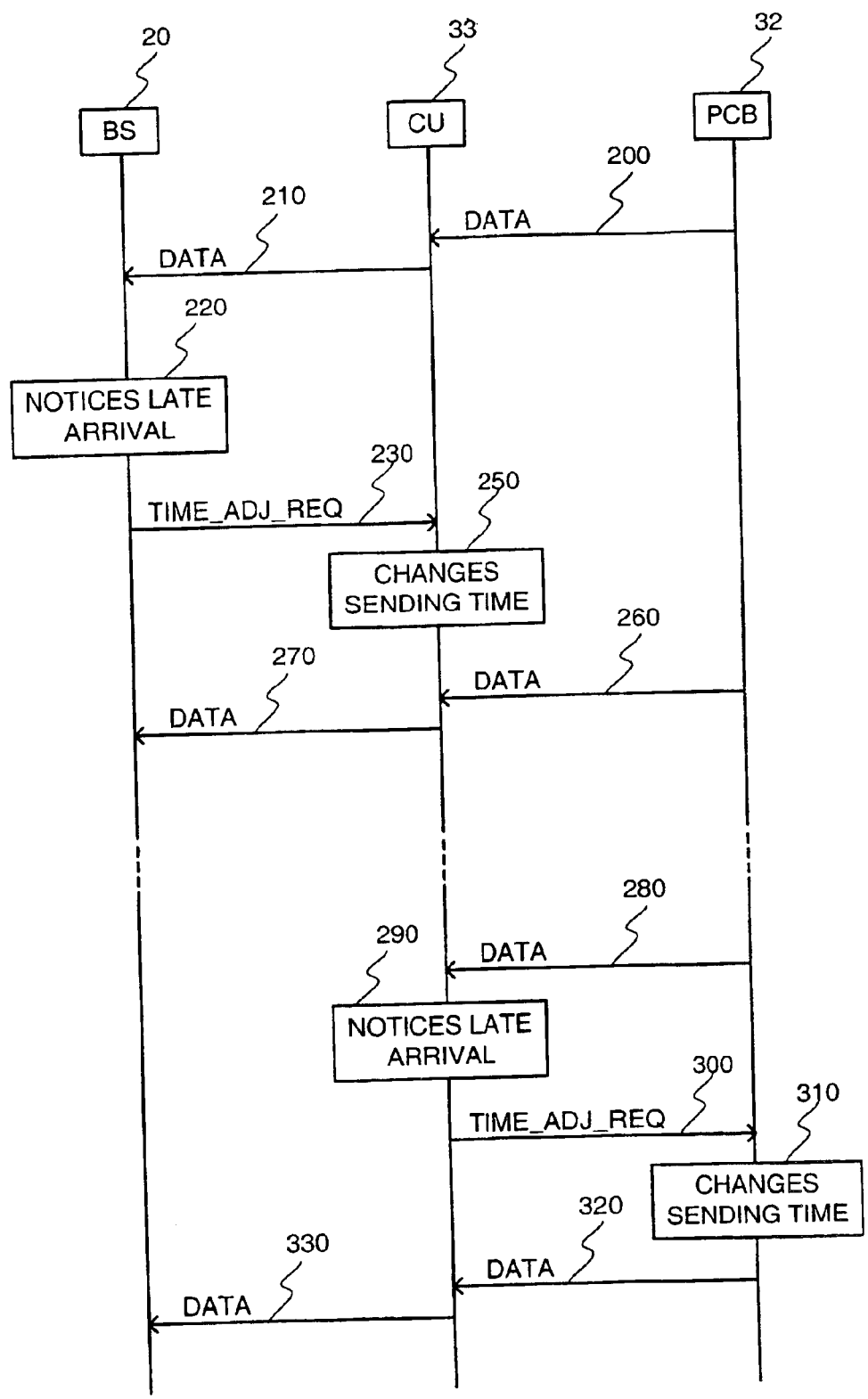
FIG. 2 illustrates an example of messaging according to an advantageous embodiment of the invention.

FIG. 2 illustrates an example of messaging in an exemplary embodiment of the invention. FIG. 2 illustrates the exchange of messages between a base station (BS) 20, a combining unit (CU) 33 and a protocol control block (PCB)

32 of a radio network controller. First, the protocol control block sends 200 one or more data packets to the combining unit. The combining unit forwards 210 the data packets to the base station. In this example, the data packets arrive too late to the base station, which subsequently notices 220 the late arrival. As a response, the base station sends 230 a timing adjustment request TIME_ADJ_REQ to the combining unit. The combining unit checks, if it can send the data earlier. In this example it can, and the combining unit subsequently changes 250 the sending time to an earlier time. After the change, the data transfer continues as usual, i.e. the protocol control block sends 260 one or more data packets to the combining unit, which forwards 270 the data packets to the base station. The data transmission continues, until at a later time in this example, the network configuration changes in a way, which results in an increased delay between the combining unit 33 and the protocol control block 32. Subsequently, when the protocol control block sends 280 one or more data packets to the combining unit, the combining unit notices 290, that the data packets arrive too late for the combining unit to send them to the base station. As a response, the combining unit sends 300 a timing adjustment request TIME_ADJ_REQ to the protocol control block. Due to the request, the protocol control block changes 310 the sending time in use. After the change, the data transfer continues as usual, i.e. the protocol control block sends 320 one or more data packets to the combining unit, which forwards 330 the data packets to the base station.

Adjustment of Delays in the Uplink Direction

Each entity in the transmission path, such as a combining unit, may inform the entity preceding it in the uplink direction in the transmission path, if data packets from the preceding entity arrive too late or too early. Each entity may further indicate, how much the arrival time of packets deviate from the desired optimum time. The preceding entity may consequently change the transmission time of data to correct the deviation. The entity receiving the data may also command the preceding entity to send the data at a specified time. For example, the receiving entity may command the preceding entity to adjust the data sending time a certain amount of time earlier. In the case of combining units, the data sending time may be the combining time.

If the preceding entity itself receives data so late, that it cannot send the data any earlier, it may in turn command the entity or the entities preceding it to send data earlier. In this way, the delay is recursively adjusted in the chain- or tree-like structure formed by the entities from end to end.

In some situations, the data sending time of an entity cannot be changed to an earlier time. For example, if a base station sends the received data in the uplink direction as soon as possible, and any eventual intermediate entities such as combining units along the path also send the data as soon as possible, the sending time of the base station or any of these intermediate entities cannot be changed to an earlier time. In such a case, the base station or base stations in question may be excluded from the active set.

In an advantageous embodiment of the invention, each entity may instead of sending a transmission time changing command to a preceding entity, enhance the transmission link between itself and the preceding entity in order to reduce delay. The transmission link may be enhanced for example by allocating more transmission time for the delayed connection. Other methods for increasing the data throughput rate of a connection may be used as well.

Preferably, the entity at the root of the delay control hierarchy, such as the controlling RNC, gives as much time for the entities preceding it in the uplink direction of the delay control hierarchy, i.e. by setting the desired arrival time of uplink data as late as the delay specifications of the involved bearer or bearers allow. Preferably, one or more of the intermediate entities in the transmission path between the controlling RNC and base stations also allow as much time as possible for the other entities preceding the entity in question.

In an advantageous embodiment of the invention, the delay can be controlled separately for each bearer or commonly for all bearers for a mobile station. Delay control of all bearers allows simple adjustment of all bearers for example in a situation, when the transmission link configuration changes e.g. due to a handover, which usually affects all bearers of a mobile station in substantially similar way. Each combining unit causes also processing delay, and since the number of combining units in a transmission path can vary when the transmission link configuration changes, the delay between a base station and the radio network controller can change stepwise for all bearers of a mobile station passing through a single base station. On the other hand, delay control of single bearers allows producing of different delays for different bearers, which in turn allows more efficient multiplexing of transmission links for bearers having less strict delay requirements. In a further embodiment of the invention, the delay can be controlled for a group of bearers as well. Therefore, a timing adjustment command may comprise identification and timing data for a single bearer, identification and timing data for multiple bearers, or identification and timing data for all bearers of a mobile station. For example, in terms of one set of specifications for an UMTS cellular system, a timing adjustment command may be specific to a certain RLC protocol, or a group of RLC protocols, or specific to a MAC protocol.

Figure 3:
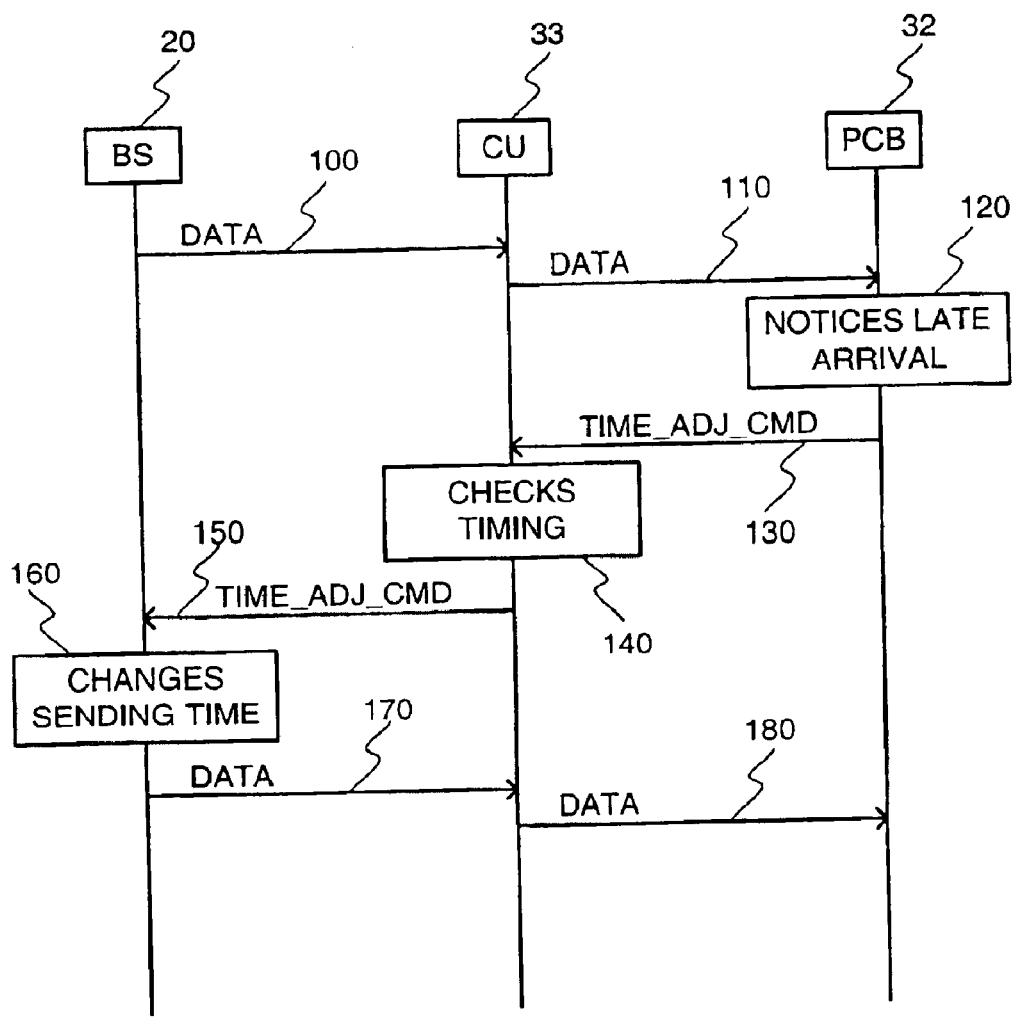
FIG. 3 illustrates an example of messaging according to an advantageous embodiment of the invention.

FIG. 3 illustrates an example of messaging in an exemplary embodiment of the invention. FIG. 3 illustrates the exchange of messages between a base station (BS) 20, a combining unit (CU) 33 and a protocol control block (PCB) 32 of a radio network controller. First, the base station sends 100 one or more data packets to the combining unit. The combining unit forwards 110 the data packets to the protocol control block. In this example, the data packets arrive too late to the protocol control block, which subsequently notices 120 the late arrival. As a response, the protocol control block sends 130 a timing adjustment command TIME_ADJ_CMD to the combining unit. The combining unit checks 140, if it can change the combining time to an earlier time. In this example, the combining unit receives packets from the base station so late, that the combining unit cannot send the packets earlier, if the base station does not change its sending time. Subsequently the combining unit sends 150 a timing adjustment command TIME_ADJ_CMD to the base station. In this example, the base station can change its sending time to an earlier time, and subsequently makes 160 the change. After changing the sending time, the base station continues sending 170 data to the combining unit, which forwards 180 the data to the protocol control block.

Further Advantageous Embodiments of the Invention

The method according to the invention can advantageously implemented in a network structure, whose transmission links are implemented using technology, which allows the parameters of a connection to be adjusted. Although the method according to the invention is advantageously implemented in transmission networks having adjustable transmission links, the method according to the invention can also be used in cases, when one or more of the transmission links are not adjustable. For example, if a data transmission link between a first combining unit receiving data from a second combining unit and the second combining unit is not adjustable, the delay control may be performed in the previously described way by treating the first and second combining units as a single unit. This may be realized for example by treating the inputs of the second combining unit as inputs of the first unit, and treating the delay created by the processing in the second combining unit and by the non-adjustable link as internal processing delays of the first combining unit. This structure may require special messaging between entities controlling the first and second combining units, or for example the creation of a single entity controlling both the first and the second combining unit.

The delay control method according to the invention is not dependent on what entities execute the method. Although the previous examples describe the delay control method using combining units and the protocol control blocks of a RNC as examples, any other entity in the transmission path can participate in the implementation of the method.

The delay control method according to the invention has many advantages. For example, since the delay control can be performed as a chain of independently controlling entities, the implementation of the delay control in a complicated network is simplified, since each controlling entity does not need to know the details of the structure it is controlling. Each controlling entity simply communicates with a lower-level entity, which in turn takes care of controlling entities in the following lower level. This property simplifies the construction of a network using equipment from multiple vendors, since the controlling entity does not need to know how a certain adjustment is implemented in a proprietary internal structure of the controlled entity and the possible proprietary structure of the entities managed by the controlled entity.

In different embodiments of the invention, the number of various entities, such as for example splitting units, combining units, base stations, and radio network controllers may be different, and differ from the number of corresponding entities in any of the examples and figures of this specification. The entities may also be realised and combined in differing ways, for example, one radio network controller can comprise one or more combining units and splitting units. Therefore, the messaging and functionality described by the previous examples can be performed between a radio network controller and a base station, i.e. across the Iub interface, and for example also between two radio network controllers, i.e. across the Iur interface.

The name of a given functional entity, such as the radio network controller, is often different in the context of different cellular telecommunication systems. For example, in the GSM system the functional entity corresponding to a RNC is the base station controller (BSC). Therefore, the term radio network controller in the claims is intended to cover all corresponding functional entities regardless of the term used for the entity in the particular cellular telecommunication system.

In the previous examples, the various entities such as combining units were described as integral entities performing all of the duties of the entity, e.g. combining of packets, and necessary adjustments, e.g. changing the transmission rate of a transmission link. In some embodiments of the invention, such entities may comprise one or more functional blocks, such as e.g. a block performing the combining of packets and a block performing the control of transmission links. As a man skilled in the art knows, such entities can be constructed in many ways. Therefore, the description of entities as integral entities in the previous examples is intended to be only an example. Such description is used in this specification for the purposes of clarity only.

Although in the previous examples, the delay control method according to the invention has been described using a tree structure formed by the entities of the telecommunications network, the invention is not limited to implementation in a tree structure. The method for uplink and downlink delay control according to the invention can also be used in a chain structure.

In the following claims, the term node is used for the various previously described entities, such as the combining and splitting units, radio network controllers and base stations. In the following claims, the terms preceding and following are to be interpreted in view of the data flow to the specified direction. As an example, a radio network controller precedes a base station in the downlink direction, since in the downlink direction, data packets pass first through a radio network controller, and only after that through a base station. Similarly, a base station precedes a radio network controller in the uplink direction, since in the uplink direction, data packets pass first through a base station, and only after that through a radio network controller. Further, the term intermediate node refers to an entity in the transmission path between the protocol control block of a radio network controller and a base station. Such an intermediate node may be for example single unit or a group of units performing the duties of a splitting unit and a combining unit.

In view of the foregoing description it will be evident to a person skilled in the art that various modifications may be made within the scope of the invention. While a preferred embodiment of the invention has been described in detail, it should be apparent that many modifications and variations thereto are possible.

What is claimed is:

1. A method for delay control adjustment in the uplink direction in a cellular telecommunications network comprising a plurality of functionally interconnected nodes for transmission of data, wherein said method comprises sending, by at least one first node of said plural nodes, a timing adjustment command to at least one second node of said plural nodes which requests said at least one second node to adjust the sending time of uplink data packets, if at least one uplink data packet sent by said at least one second node arrives at said at least one first node at a point in time, which point in time is outside a predefined time period, wherein said functional interconnected nodes are hierarchical in that at least one node precedes said at least one first node in the uplink direction in the network structure, and at least one node follows said at least one second node in the uplink direction in the network structure.

2. A method according to claim 1, wherein at least one of said at least one second node is a base station (20).

3. A method according to claim 1, wherein at least one of said at least one first node is a protocol control block (32) of a radio network controller.

4. A method according to claim 1, wherein at least one of said nodes is a combining unit (33).

5. A method for delay control adjustment in the downlink direction in a cellular telecommunications network comprising a plurality of functionally interconnected nodes for transmission of data, wherein said method comprises sending, by at least one second node of said plural nodes, a timing adjustment command to at least one first node which requests said at least one second node to adjust the sending time of downlink data packets, if at least one downlink data packet sent by said at least one first node arrives at said at least one second node at a point in time, which point in time is outside a predefined time period, wherein said functional interconnected nodes are hierarchical in that at least one node precedes said at least one second node in the downlink direction in the network structure, and at least one node follows said at least one first node in the downlink direction in the network structure.

6. A method according to claim 5, wherein at least one of said at least one second node is a base station (20).

7. A method according to claim 5, wherein at least one of said at least one first node is a protocol control block (32) of a radio network controller.

8. A method according to claim 5, wherein at least one of said nodes is a splitting unit (33).

9. A system in a cellular telecommunications network for controlling delays between a radio network controller and at least one base station, said system comprising:

a radio network controller for controlling the transfer of data, at least one intermediate node for forwarding data in the network, which at least one intermediate node is functionally connected to said radio network controller, and a base station for sending and receiving data, which base station is functionally connected to said at least one intermediate node, wherein said radio network controller is arranged to send a timing adjustment command to at least one of said at least one intermediate node as a response to reception of at least one data packet from said at least one of said at least one intermediate node after a predetermined time period, and said at least one intermediate node is arranged to send a timing adjustment command to said base station as a response to reception of at least one data packet from said base station after a predetermined time period, each timing adjustment command comprising a request to adjust a sending time of data packets.

10. A system according to claim 9, wherein said base station is arranged to send a timing adjustment request to at least one of said at least one intermediate node as a response to reception of at least one data packet from said at least one of said at least one intermediate node after a predetermined time period.

* * * * *